April 18, 1961 E. H. BRAUER, JR 2,979,747
WORK CONVEYING AND BRUSHING MACHINE
Filed Aug. 8, 1957 8 Sheets-Sheet 1

INVENTOR.
EDWIN H. BRAUER, JR.
BY
Oberlin & Limbach
ATTORNEYS

April 18, 1961 E. H. BRAUER, JR 2,979,747
WORK CONVEYING AND BRUSHING MACHINE
Filed Aug. 8, 1957 8 Sheets-Sheet 2

INVENTOR.
EDWIN H. BRAUER, JR.
BY
Oberlin & Limbach
ATTORNEYS

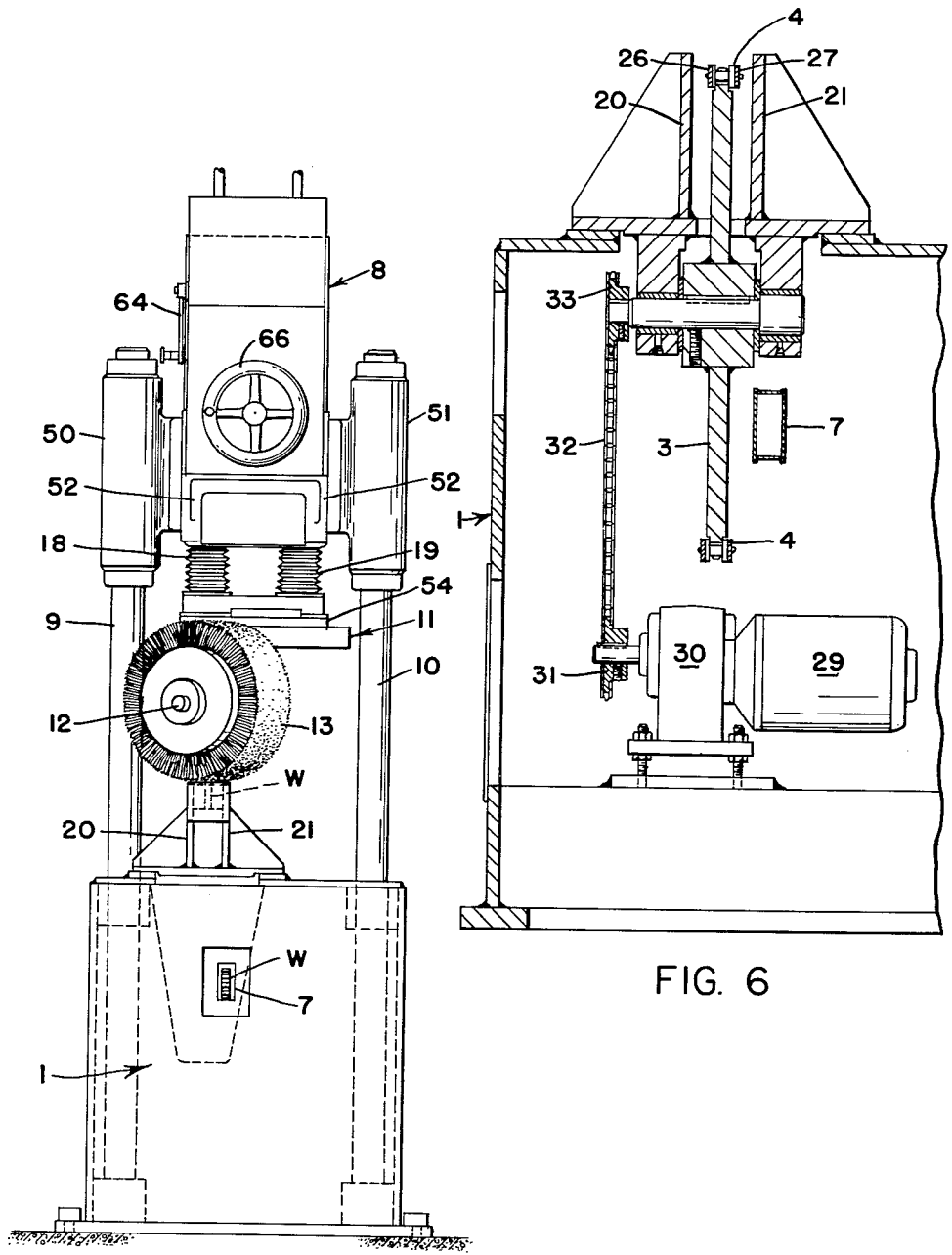

April 18, 1961     E. H. BRAUER, JR     2,979,747
WORK CONVEYING AND BRUSHING MACHINE
Filed Aug. 8, 1957     8 Sheets-Sheet 4

INVENTOR.
EDWIN H. BRAUER, JR.
BY
Oberlin & Limbach
ATTORNEYS

April 18, 1961  E. H. BRAUER, JR  2,979,747
WORK CONVEYING AND BRUSHING MACHINE
Filed Aug. 8, 1957  8 Sheets-Sheet 5
FIG. 5
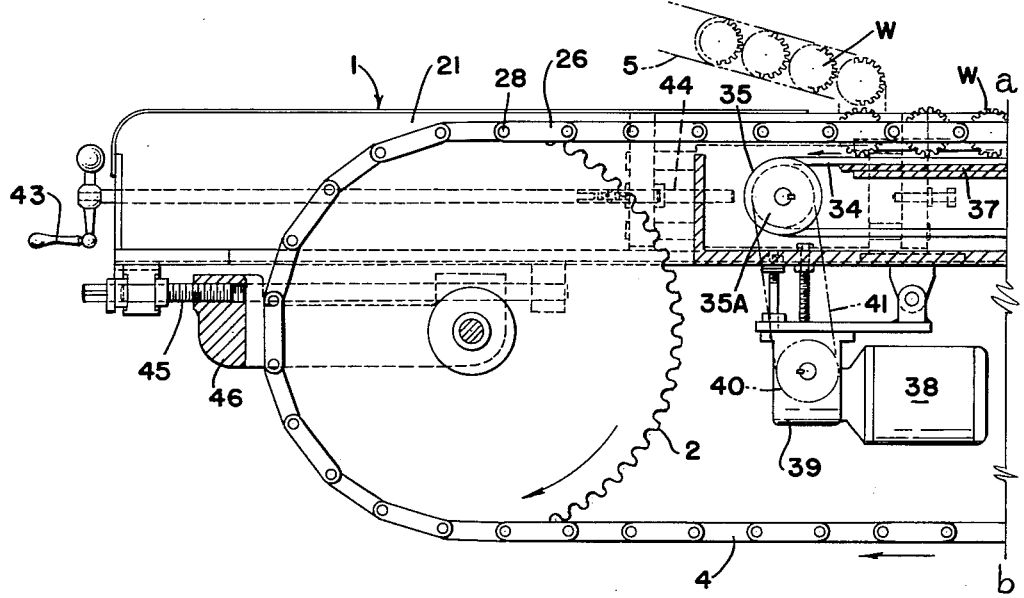
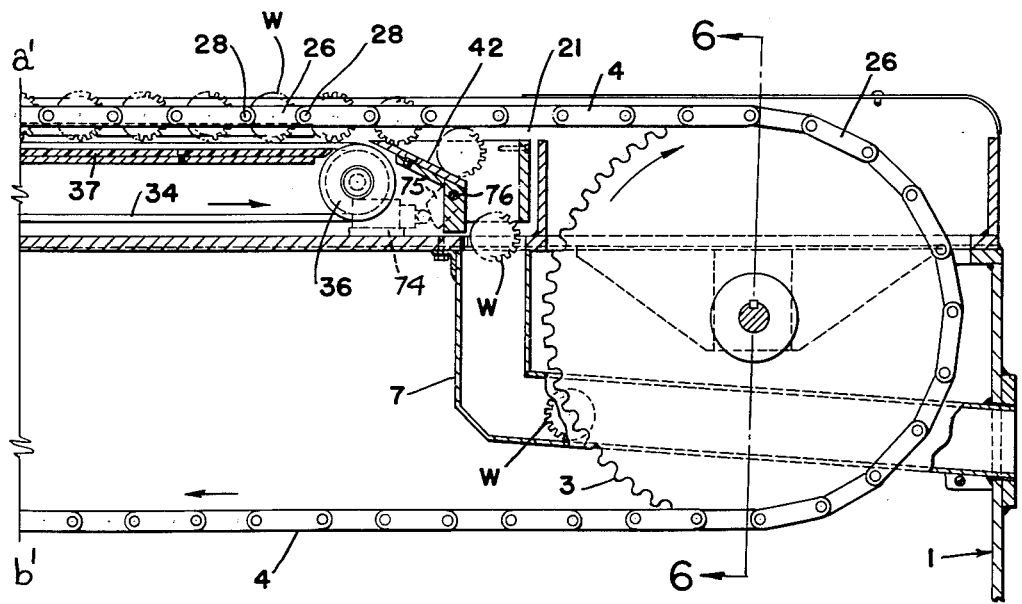
FIG. 5A
INVENTOR.
EDWIN H. BRAUER, JR.
BY
Oberlin & Limbach
ATTORNEYS INVENTOR.
EDWIN H. BRAUER, JR.
BY
Oberlin & Limbach
ATTORNEYS April 18, 1961 E. H. BRAUER, JR 2,979,747
WORK CONVEYING AND BRUSHING MACHINE
Filed Aug. 8, 1957 8 Sheets-Sheet 7
FIG. 10
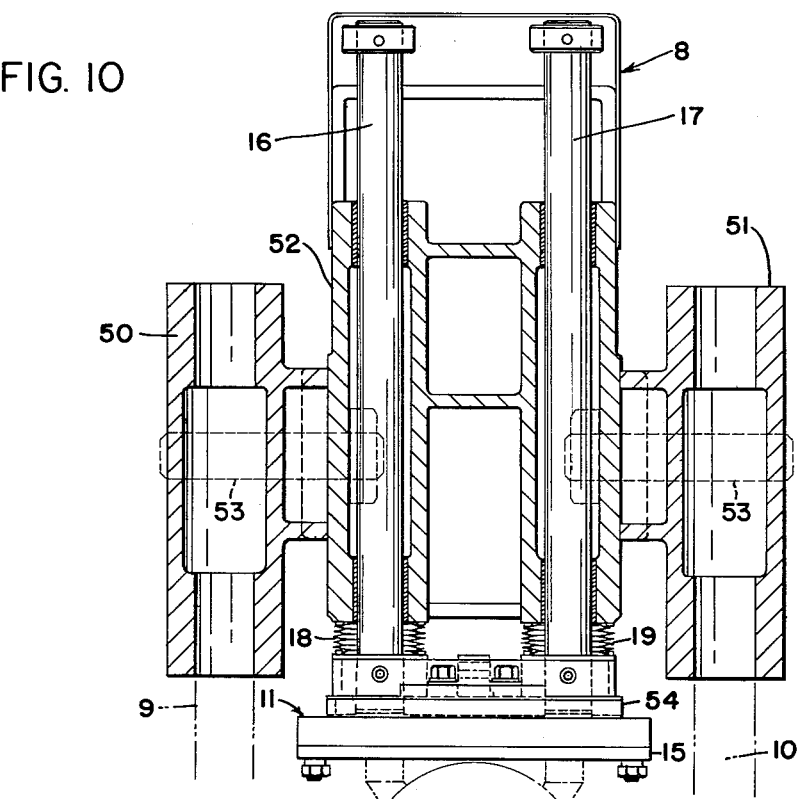
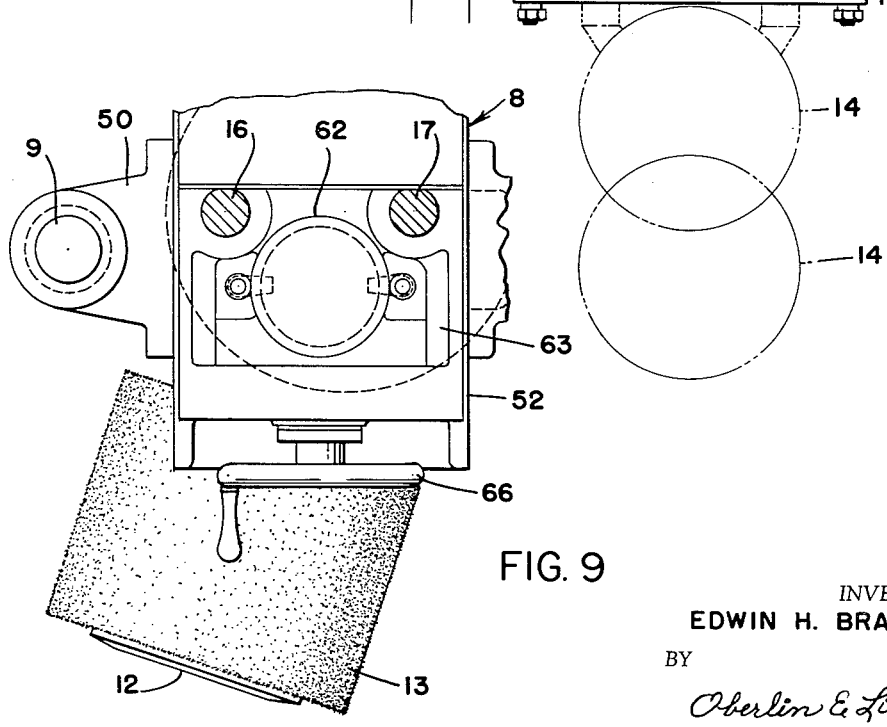
FIG. 9
INVENTOR.
EDWIN H. BRAUER, JR.
BY
Oberlin E. Limbach
ATTORNEYS April 18, 1961  E. H. BRAUER, JR  2,979,747
WORK CONVEYING AND BRUSHING MACHINE
Filed Aug. 8, 1957  8 Sheets-Sheet 8

INVENTOR
EDWIN H. BRAUER, JR.
BY
Oberlin & Limbach
ATTORNEYS

United States Patent Office 2,979,747
Patented Apr. 18, 1961

2,979,747

WORK CONVEYING AND BRUSHING MACHINE

Edwin H. Brauer, Jr., Cleveland, Ohio, assignor to The Osborn Manufacturing Company, Cleveland, Ohio, a corporation of Ohio Filed Aug. 8, 1957, Ser. No. 677,111

1 Claim. (Cl. 15—21)

This invention relates as indicated to a novel work conveying and brushing machine, and more particularly to a machine adapted continuously to transport a plurality of work-pieces past a power driven rotary brush while presenting such work-pieces to the brush in a manner to ensure the most efficient action of the latter thereon.

Various devices for presenting work-pieces to power driven rotary brushes are known in the art, one commercially successful form being that shown and described in Nelson et al. Patent 2,682,065. Such patented machine utilizes a reciprocatory motion for presenting a work-piece to the brush or brushes and for returning the finished work-piece to discharge position. In accordance with the present invention, I utilize a continuous work-piece transporting or conveying means adapted to carry work-pieces such as gears and the like continuously past the brush or brushes which are to operate thereon while also rotating such work-pieces to present all desired portions thereof to the brushing action.

It is an important object of my invention to provide continuous work-piece conveying means adapted positively to position a large number of work-pieces relative to each other as they pass the brushing station.

Another object is to provide such conveying means and associated mechanism operative to effect rotation of the individual work-pieces as they pass through the brushing station and thereby to obtain uniform brushing action thereon.

A further object is to provide a brushing machine of the nature indicated adapted to be included in a continuous automatic line, the work-pieces being fed thereto from a suitable hopper or other supply and being discharged therefrom in a manner suitable for delivery to a subsequent work station.

Still another object is to provide a brushing line which will be wholly automatic in operation and require a minimum of supervision and maintenance.

Other objects of the invention will appear as the description proceeds.

To the accomplishment of the foregoing and related ends, said invention then comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

In said annexed drawing:

Fig. 1A is a fragmentary detail view of the feed chute;

Fig. 3 is an end elevation of such machine;

Figure 7:
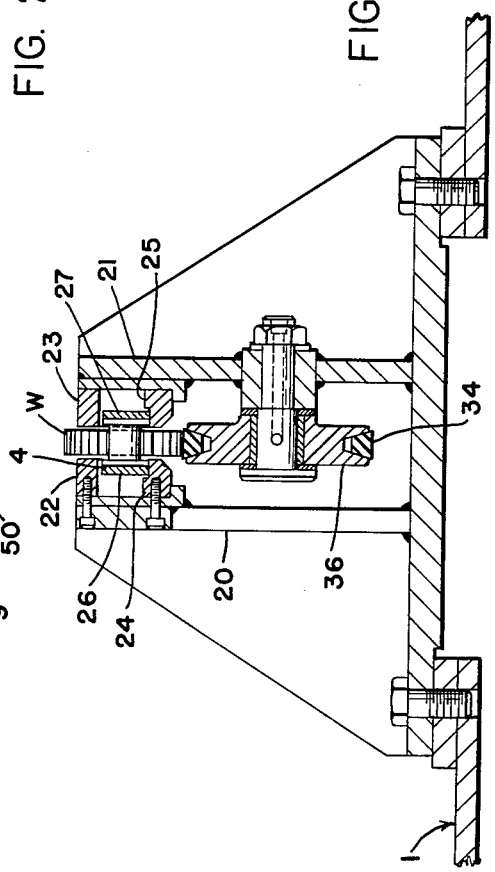
Figure 4:
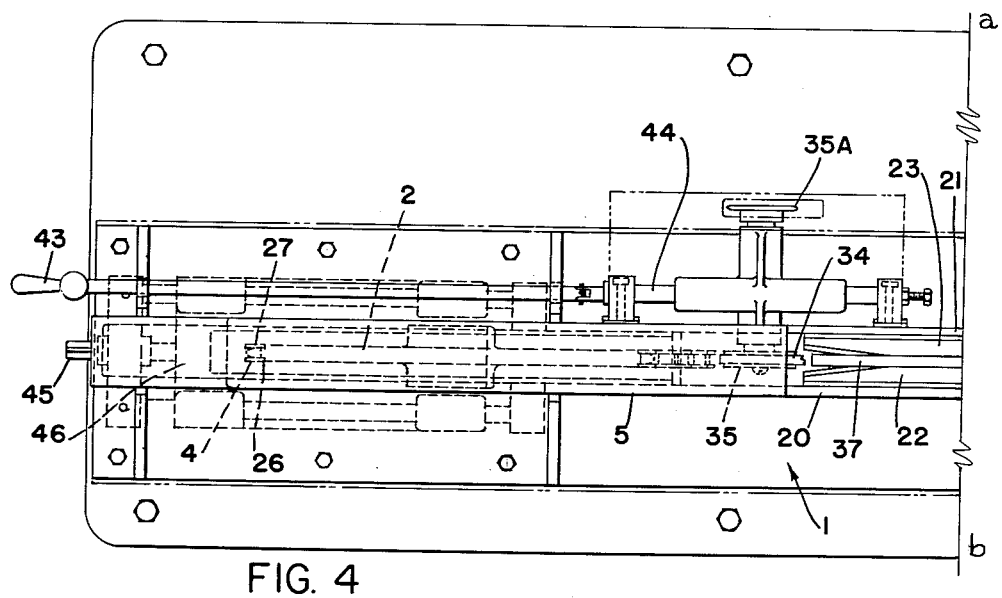
Figure 4A:
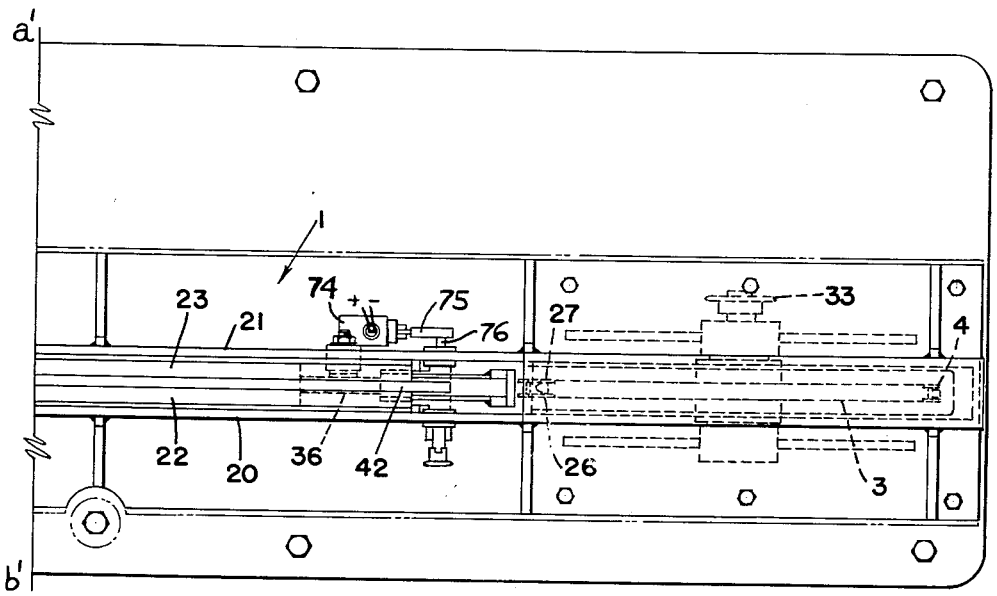
Figure 8:
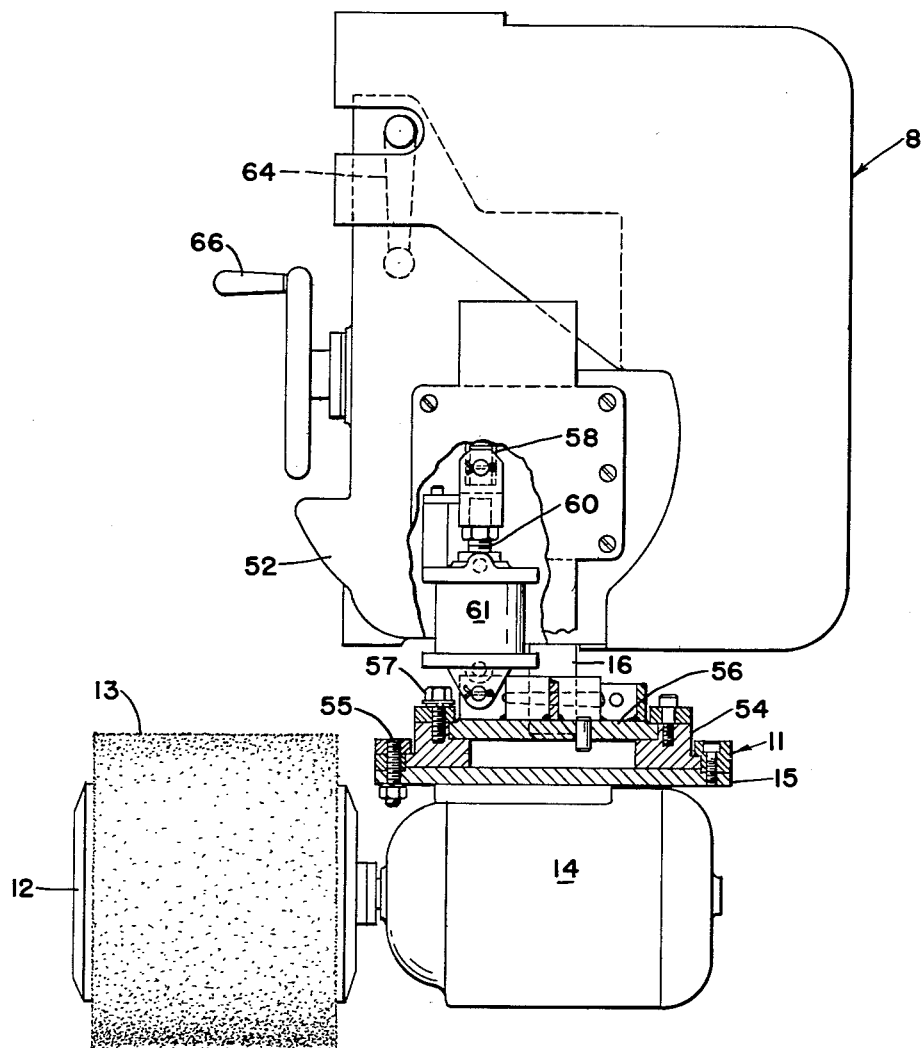

Figs. 4 and 4A together constitute a top plan view of the work-piece conveying mechanism and base housing of the machine, on an enlarged scale;

Figs. 5 and 5A together comprise a vertical longitudinal section through the upper portion of such base housing and the work-piece conveying means on the same scale as Figs. 4 and 4A;

Fig. 6 is a vertical transverse section through such base housing showing the conveyor drive means;

Fig. 7 is a fragmentary transverse section through the continuous belt on which the work-pieces are adapted to rest as they are carried past the brushing station for rotation about their individual axes;

Fig. 8 is a side elevational view of the brush stand and brush head, partly broken away better to show the internal arrangement thereof;

Fig. 9 is a fragmentary top plan view showing the power driven rotary brush swung into angular position;

Fig. 10 is a vertical transverse section through such brush stand; and

Figure 11:
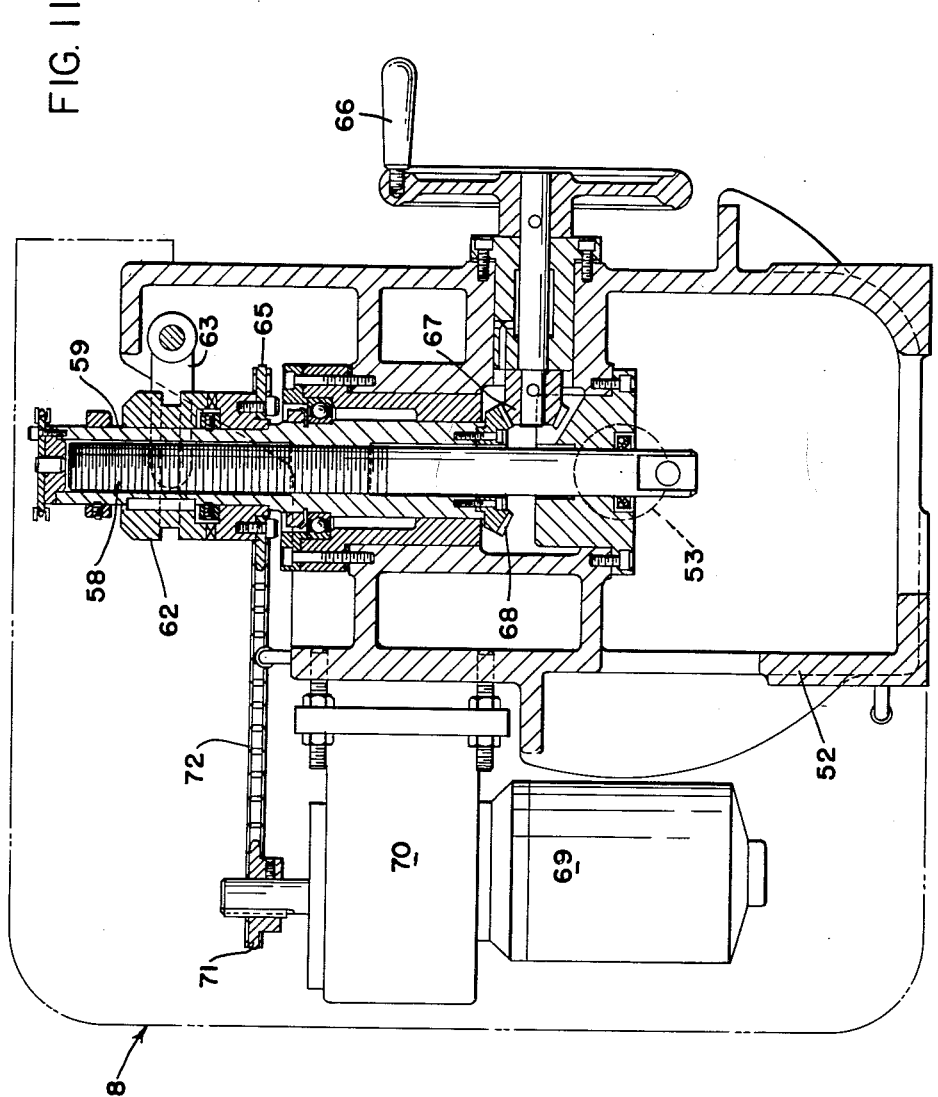

Fig. 11 is a vertical section through such stand at right angles to Fig. 10.

Referring now more particularly to such drawing and especially Figs. 1–5A thereof, the embodiment of my invention there illustrated comprises a generally rectangular base frame or housing 1 within which are journalled large sprockets 2 and 3 having an endless chain 4 mounted thereon. A feed chute 5 is supported by bracket 6 on the upper deck of the housing to provide an inclined ramp down which work-pieces such as gears W are adapted to roll. A discharge chute 7 is provided within the housing adjacent sprocket 3 to receive work-pieces after passage by the brushing station and to deliver them from the machine.

A brushing stand 8 is supported on base housing 1 by means of two columns 9 and 10 for vertical positioning thereon. Such brushing stand carries a brushing head 11 journalling a generally horizontal brush arbor 12 with a cylindrical power driven rotary brush 13 mounted thereon. Such arbor and brush may be driven by means of a reversible electric motor 14 carried by the frame 15 in which the arbor is journalled, such frame in turn being suspended from stand 8 by a pair of vertically extending rods 16 and 17 (Fig. 10) enclosed in accordion pleated dust guards 18 and 19 (Fig. 3). The operation of this brushing head will be explained more in detail below.

The work-pieces W are sequentially discharged from feed chute 5 into a work receiving guideway defined between the two parallel upstanding flanges 20 and 21. Such upstanding flanges carry longitudinally extending bars or wear strips 22, 23, 24 and 25 (Fig. 7) defining the sides of the actual guideway within which the work-pieces such as gears W are transported by means of conveyor chain 4. Such conveyor chain is of the parallel link and pivot type whereby each work-piece W is received within the space between parallel link members 26 and 27 and between successive pivot pins 28 (Fig. 5A and Fig. 7). Conveyor chain 4 is driven by means of electric motor 29 through worm gear reduction unit 30, sprocket 31, sprocket chain 32, sprocket 33 and conveyor sprocket 3 (Fig. 6) so that the upper course of such conveyor chain will travel from left to right as viewed in Fig. 1 of the drawing and will accordingly transport successive work-pieces beneath brush 13 to discharge chute 7.

The guideway defined between upstanding flanges 20 and 21 and the wear strips or rails supported by their inner faces comprises a slot which opens downwardly into the base housing 1 of the machine. It is accordingly necessary to provide a support for the work-pieces W as the latter are transported along such guideway through the action of conveyor chain 4. This support comprises an endless belt 34 which may be of rubberized fabric, for example, passing about end pulleys 35 and 36. Throughout most of the extent of the upper course of such belt, it is supported on its underside by a shelf 37 of anti-friction material. Accordingly, such upper course of belt 34 is adapted to support the work-pieces W thereon as they are transported longitudinally of the guideway through the action of chain conveyor 4. It will, moreover, be apparent that when such work-pieces are of generally circular outline such as the gears W, they may be caused to roll about their axes through frictional engagement with the upper course of the supporting belt 34. This rolling action may be and ordinarily will be increased by driving such belt in a direction opposite to that of conveyor chain 4 so so that the upper course of belt 34 will travel from right to left as viewed in Figs. 1, 5 and 5A whereas the upper course of chain conveyor 4 is travelling from left to right as viewed in such figures. This may be achieved by driving pulley 35 through electric motor 38, worm gear reduction unit 39, pulley 40, drive belt 41, and pulley 35A (Fig. 5). By thus driving belt 34 at a selected speed, the work-pieces W may be caused to rotate about their axes a number of times as they pass beneath the power driven rotary brush 13 and accordingly a thorough and uniform brushing operation will be performed thereon. When the work-pieces have been conveyed beyond such brush and beyond pulley 36, they reach inclined ramp 42 leading to discharge chute 7 and drop clear of chain 4 as they roll into the upper end of such chute.

Belt 34 may be adjustably tensioned by turning hand crank 43 and thereby screw 44. Conveyor chain 4 may likewise be tensioned by turning screw 45 engaging bracket 46 in which sprocket 2 is journalled.

Figure 1:
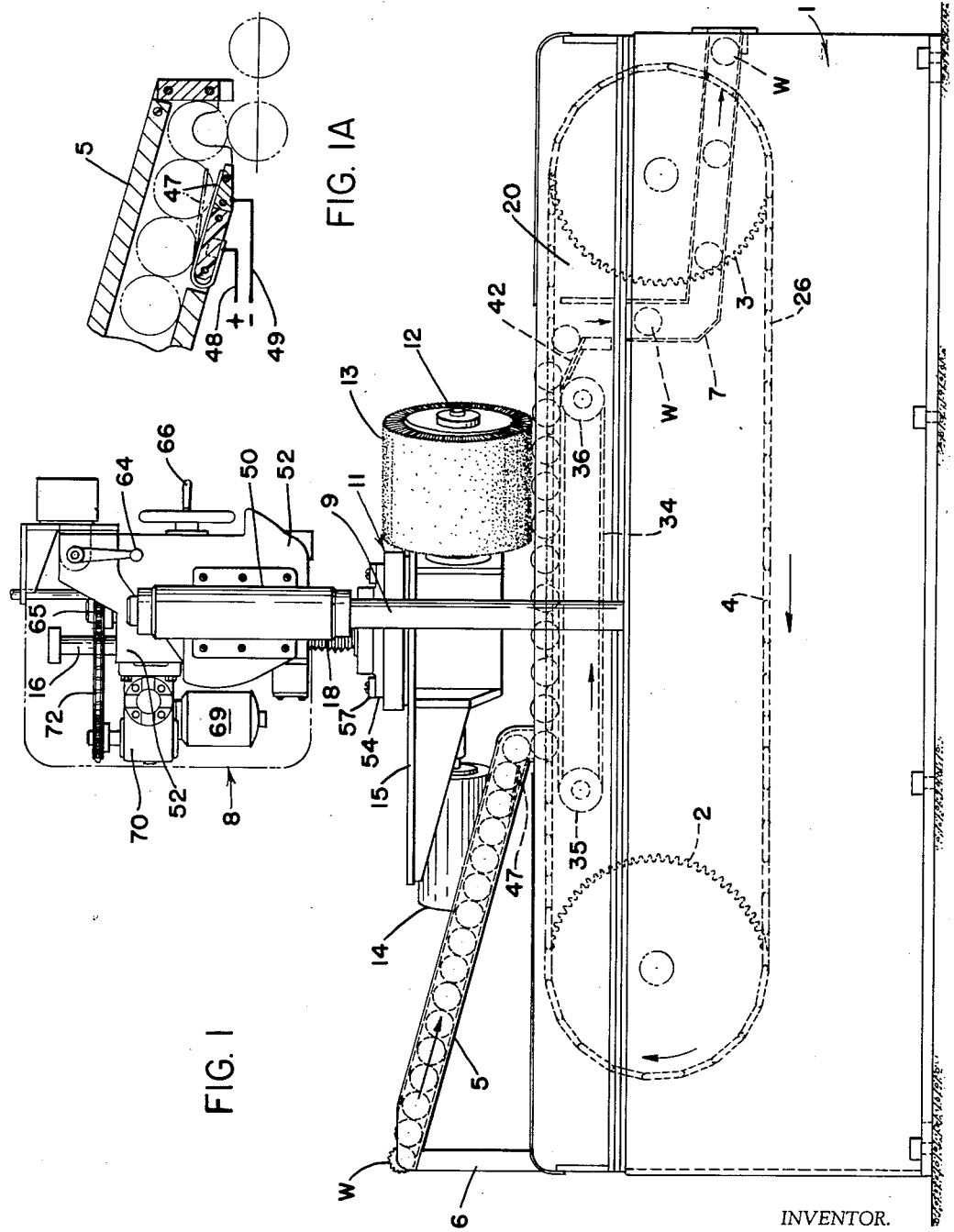
Fig. 1 is a side elevation of my new machine.
Figure 2:
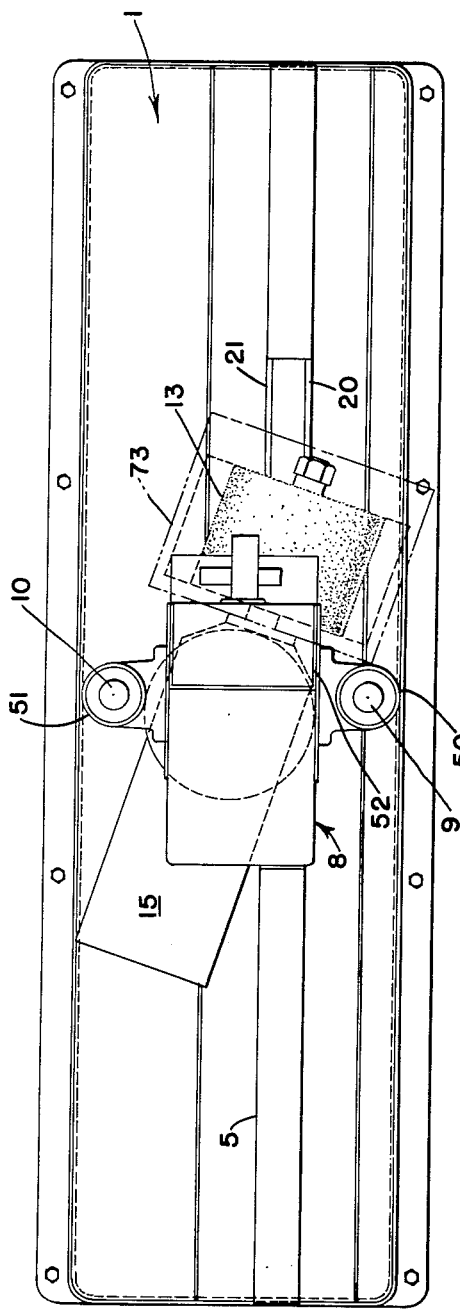
Fig. 2 is a top plan view of such machine.

As shown in Figs. 1 and 1A, a leaf spring 47 may be provided within feed chute 5 to serve as an electric contact effective to connect leads 48 and 49 when depressed by work-pieces W. This circuit may be of the low potential, high impedance type arranged to actuate a relay through an electronic tube circuit, lead 48 being connected to the grid circuit of the tube and lead 49 being a ground connection. The circuit including leads 48 and 49 will accordingly be broken when the last work-piece drops from the chute into the machine, and this may be utilized to actuate a warning signal such as a light or bell or, if desired, to stop the machine.

By turning the brush 13 somewhat at an angle (other than a right angle) to the direction of travel of the work, the rotation of the individual work-pieces about their axes may be assisted rather than hindered. It will also be appreciated that the workpiece supporting belt 34 may be driven in either direction as desired, the differential in the speed of travel of such belt and of conveyor 4 effecting the desired rotation of the work-pieces.

Turning now to Figs. 8-11 inclusive of the drawing, the brushing stand 8 as above indicated is supported on posts or columns 9 and 10 by means of members 50 and 51 (see Figs. 3 and 10) sleeved and adjustably vertically positioned thereon. The head frame 52 is pivotally adjustably mounted between members 50 and 51 by means of horizontal trunions such as 53 so that such head frame and accordingly rods 16 and 17 may be swung to tilt or incline the brush arbor 12 as may be desired.

The sub-plate 15 (Fig. 8) which carries the brush motor and brush (either spaced for balance as shown in Fig. 1 or close coupled as shown in Fig. 8) is mounted on circular ways 54 whereby the brush arbor may be adjustably angularly positioned about an axis normal to the axis of such arbor. After making the desired adjustment, plate 15 is clamped in position by means of clamps such as 55. Such circular ways 54 are in turn mounted on straight ways 56 and clamped in adjusted position thereon by means of clamps 57. As previously noted, rods 16 and 17 serve to guide this assembly of adjustable ways and the brush arbor carried thereby in main head frame 52 for in-and-out movement relative to such head frame.

In order thus adjustably to position such assembly relative to main head frame 52, a vertical screw 58 is threaded within a nut 59 mounted in bearings in such head frame. The lower end of screw 58 is connected to the rod 60 of piston-cylinder assembly 61 (Fig. 8) which in turn is pivotally connected to the upper way 56 supporting the brush motor 14 and brush 13. A clutch 62 is adapted to be reciprocated by means of clutch lever 63 and handle 64 to disengage sprocket 65 from nut 59. When such sprocket is thus disengaged, the nut may be rotated to reciprocate screw 58 by turning hand crank 66 which is connected with nut 59 by means of bevel gearing 67 and 68. It will accordingly be seen that the normal position of the brush relative to the main head frame 52 may be regulated by hand wheel 66 in this manner.

When sprocket 65 is clutched to nut 59, such nut may also be rotated to reciprocate screw 58 by means of electric motor 69, reduction unit 70, sprocket 71 and sprocket chain 72. Such reversible motor 69 may be energized for this purpose either through manually actuated control means or by control means responsive to variations in the power demand on brush motor 14, moving the brush 13 toward the work when the demand on motor 14 drops below a predetermined level and moving brush 13 away from the work when the power demand on motor 14 rises above a predetermined level due to excessive pressure of the brush against the work.

Piston-cylinder assembly 61 may be utilized to move the brush support in and out relative to main head frame 52 a short predetermined distance after other adjustments have been made. Thus, for example, it will generally be desired to retract the brush out of work engaging position whenever conveyor 4 is stopped for purposes of inspection or any other reason, to prevent over-brushing of the work. The brush 13 may desirably be enclosed within a protective hood indicated in dot and dash line at 73 in Fig. 2.

As a further feature of this invention there is provided a limit switch 74 (Figs. 4A and 5A) that is actuated by the cam 75 of the operating rod 76 of ramp 42. When the ramp 42 is swung out of alignment with the work receiving guideway to provide access to belt 34 said switch 74 will be actuated by cam 75 to open the conveyor circuit and to shut off power to the machine. Another limit switch (not shown) may be positioned at the entrance to the discharge chute 7 for the purpose of shutting off the machine in the event of a pile up of work-pieces W. This limit switch may be actuated by a leaf spring (like 47 previously described) which operated to close a relay, the control circuit shutting off the machine when the leaf spring is pressed for an extended period of time that is longer than usually required for a work-piece W to pass the leaf spring or "feeler" contact.

Other modes of applying the principle of my invention may be employed instead of the one explained, change being made as regards the means and the steps herein disclosed, provided those stated by the following claim or its equivalent be employed.

I therefore particularly point out and distinctly claim as my invention:

Apparatus for brushing a plurality of generally circular work-pieces such as gears and the like including a generally horizontal conveyor having openings vertically therethrough adapted to receive such work-pieces therein, a traveling belt disposed directly beneath said conveyor adapted to support such work-pieces in such openings, means operative actively to move said belt along a path generally parallel to the path of travel of said conveyor and at a lineal speed sufficient to rotate such work-pieces in such openings at a speed substantially faster than that obtainable by rolling such work-pieces along a stationary supporting surface through travel of said conveyor, a power driven rotary brush arranged and disposed to engage and actively brush such work-pieces as they are thus advanced by said conveyor and rotated by said traveling belt, means operative to deposit work-pieces to be brushed into such openings of said conveyor and upon said belt in advance of such brushing station, the course of said belt supporting such work-pieces terminating prior to the termination of the corresponding course of said conveyor to permit gravity discharge of such work-pieces from such openings of said conveyor subsequent to the performance of such brushing operation thereon, and work-piece collection means disposed below said conveyor beyond the termination of said belt.

References Cited in the file of this patent

UNITED STATES PATENTS

| | | |
|---|---|---|
| 568,685 | Irrgang | Sept. 29, 1896 |
| 2,073,837 | Ghent | Mar. 16, 1937 |
| 2,282,474 | Howard | May 12, 1942 |
| 2,380,550 | Reed | July 31, 1945 |
| 2,386,649 | Belcourt | Oct. 9, 1945 |
| 2,513,213 | Schick | June 27, 1950 |
| 2,513,587 | Reeves | July 4, 1950 |
| 2,528,293 | Ashlock | Oct. 31, 1950 |
| 2,673,361 | McCutchan | Mar. 30, 1954 |
| 2,690,034 | Laverdisse | Sept. 28, 1954 |
| 2,714,786 | Powell | Aug. 9, 1955 |

FOREIGN PATENTS

| | | |
|---|---|---|
| 474,371 | Great Britain | Oct. 25, 1937 |
| 756,360 | Great Britain | Sept. 5, 1956 |